(12) United States Patent
Kasparak et al.

(10) Patent No.: US 6,382,702 B1
(45) Date of Patent: May 7, 2002

(54) CONVERTIBLE ROOF

(75) Inventors: Manfred Kasparak; Josef Seibold, both of Neureichenau; Wolfgang Dangl, Mainburg; Dieter Demmel, Penzing; Andreas Reitinger, Coblfing; Markus Märkl, Dingolfing, all of (DE)

(73) Assignees: PARAT Automotive Schonenbach Gmb& O Co. KG, Remscheid; Bayerische Motoren Werke AG, Munich, both of (DE)

( * ) Notice: Subject to any disclaimer, the term of this patent is extended or adjusted under 35 U.S.C. 154(b) by 0 days.

(21) Appl. No.: 09/722,256

(22) Filed: Nov. 24, 2000

(30) Foreign Application Priority Data

Nov. 26, 1999 (DE) .......................................... 199 57 049

(51) Int. Cl.[7] .............................. B60J 7/00; B60J 7/08; B60J 10/10
(52) U.S. Cl. .................................. 296/107.05; 296/213
(58) Field of Search ................................. 296/213, 135, 296/107.05

(56) References Cited

U.S. PATENT DOCUMENTS 2,146,438 A * 2/1939 Olsen
2,203,931 A * 6/1940 Solomon et al.
2,572,592 A * 10/1951 Brandt et al.
4,684,419 A * 8/1987 Agosta

FOREIGN PATENT DOCUMENTS

DE 4234 811 A1 4/1994
DE 298 19 187 U1 9/1999

* cited by examiner

Primary Examiner—Joseph D. Pape
Assistant Examiner—Scott Carpenter
(74) Attorney, Agent, or Firm—Herbert Dubno

(57) ABSTRACT

A convertible roof has a rain channel along the longitudinal edge in which a spacer of rubber or synthetic resin is received between a bead-forming strip and the roof covering and is attached to the bead-forming strip and an edge of the roof covering with a U-shaped binding strip.

8 Claims, 3 Drawing Sheets

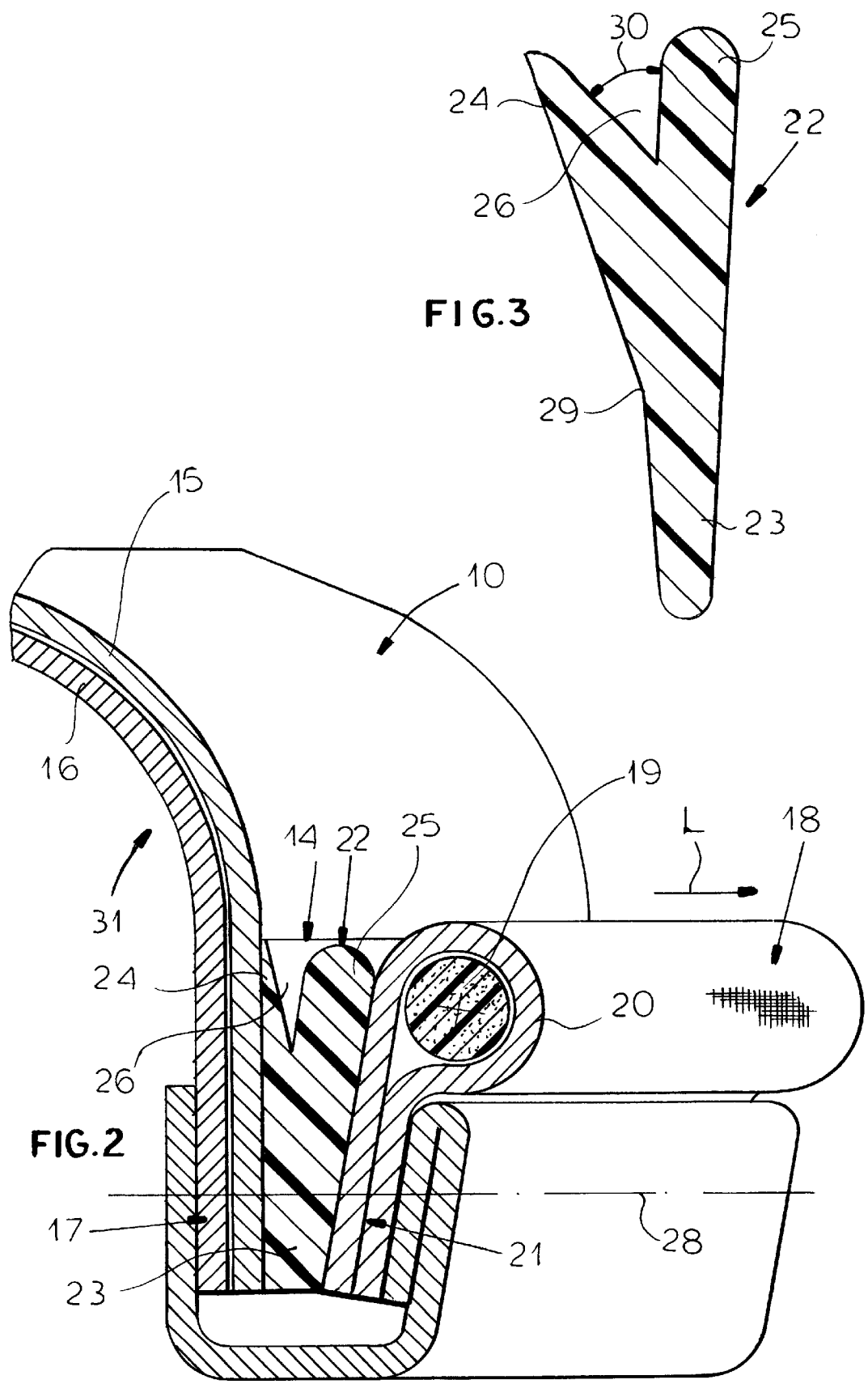

CONVERTIBLE ROOF

SPECIFICATION

Field of the Invention

Our present invention relates to a convertible automobile roof and, more particularly, to an improved rain gutter built into a convertible roof.

BACKGROUND OF THE INVENTION

A convertible roof with a rain gutter or channel extending along each longitudinal edge and composed of flexible material is known. The roof covering is composed, in such systems, of inner and outer layers and the downwardly-turned longitudinal edge regions are engaged in substantially U-shaped binder strips which hold against the roof material a bead-forming member, e.g. of foam rubber which is enclosed in a strip whose downwardly-extending portions are held against the roof material by the binder strip. The bead lies outwardly of the roof covering so that the rain channel is formed between that bead and the roof material.

The advantage of such a structure which is similar to that of DE 42 34 811 A1 is that the appearance of the roof covering is aesthetic. However, the bead forming member does not function well from the point of view of guiding the rain water from the roof as a channel and may not be satisfactory where that channel is located above the vehicle door or a vehicle window. In many cases, therefore, the water can splash from the channel.

OBJECTS OF THE INVENTION

It is the principal object of the present invention to provide an improved convertible automobile roof with an improved rain channel.

Another object of the invention is to provide a convertible roof in which the water guidance is improved, the tendency for the rain channel to collect contaminants is reduced and the optical appearance or aesthetic is unaffected by comparison with earlier systems.

Still another object of the invention is to provide an improved convertible roof and rain gutter which is free from drawbacks of earlier systems and yet has sufficient flexibility or elasticity to be able to follow the folding of the convertible roof and the unfolding thereof in the opening and closing actions without permanent deformation.

SUMMARY OF THE INVENTION

These objects and others which will become more readily apparent hereinafter are attained, in accordance with the invention, in a top for a convertible vehicle which comprises:

a flexible roof covering having a longitudinal edge;

a flexible bead-forming strip attached to the roof covering along the an outer side of the edge; and a flexible channel-forming spacer between the bead-forming strip and the roof covering along the edge.

According to the invention, therefore, between the roof cover which can have two layers as has been described, a flexible channel-forming spacer is introduced between the bead-forming strip and the roof covering along its edge.

Without, therefore, modifying the optical characteristics and aesthetics of the prior channel structure of a convertible roof, it is possible with the present invention and the insertion of the channel-forming spacer to enlarge the rain channel to a significant extent so that larger quantities of water can be carried away and so that accumulation of contaminants over time will be precluded.

According to a feature of the invention the channel-forming spacer is an injected or extruded molding of an elastic synthetic resin, preferably EPDM, i.e. an ethylene-propylene-diene monomer synthetic resin which can have a relatively low hardness and, for example, 60 to 70 Shore-A, thereby providing sufficient flexibility and elasticity to follow the folding and unfolding of the convertible top without permanent deformation.

According to a feature of the invention, the channel of the spacer is wedge shaped with a wedge angle of about 25 to 30°. Under such conditions contaminants tend to be swept away by the rain water and do not permanently collect. The elastic strip or profile deforms flexibly upon opening and closing of the convertible top with restoration of its original shape, thereby causing any dirt particles which tend to adhere in the channel to spring loose.

It has been found to be advantageous, moreover, to provide the spacer in its channel-forming regions with a smooth upper surface. This ensures that the water will run off better on the one hand, and on the other, that there will be less tendency for contaminants to collect than would be the case with a rough surface. In general in the past there has been a tendency to provide rough surfaces in the channel-forming regions, for example, to the channel so formed directly by the bead and a rough fabric layer covering the latter.

Advantageously, the spacer has a height such that it does not extend above the flexible bead in the forming strip. As a result, the channel-forming spacer remains practically invisible and all that can be seen along the edge is the bead-forming strip as before.

According to the invention, moreover, the bead-forming strip comprises a bead and a bead cover extending around the bead and having respective margins extending downwardly therefrom, the edge, the spacer and the margins being held in a U-section binder strip and being secured together with the binder strip receiving the edge at the end.

The spacer can have an upper part spreading outwardly from a lower part whereby a flank of the spacer adapted to lie against the roof covering has angularly adjoining segments prior to incorporation of the spacer in the top but coplanar and lying flat against the roof covering when the spacer is affixed between the bead-forming strip and the roof covering along the edge.

The difference between the system of the invention and the prior art system described, of course, is that within the binder strip, the spacer lies between the bead-forming strip and the layers of the fabric bead cover and the flexible roof covering. It has been found to be advantageous for the spacer to have an upper part spreading outwardly from a lower part whereby a flank of the spacer adapted to lie against the roof covering has angularly adjoining segments prior to incorporation of the spacer in the top but coplanar and lying flat against the roof covering when the spacer is affixed between the bead-forming strip and the roof covering along the edge.

The elasticity of the strip, once it is secured in place, e.g. by stitching, thus serves to seal between the spacer and the roof covering on the one hand and the bead cover on the other. While the relaxation of the spacer thus serves to form a tight seal with the flanking surfaces, it also ensures that the channel will remain open.

BRIEF DESCRIPTION OF THE DRAWING

The above and other objects, features, and advantages will become more readily apparent from the following description, reference being made to the accompanying drawing in which:

FIG. 2 is a section drawn to a larger scale taken along the line II—II of FIG. 1;

FIG. 3 is a section through the spacer prior to its incorporation in the assembly of FIG. 1.

SPECIFIC DESCRIPTION

Figure 4:
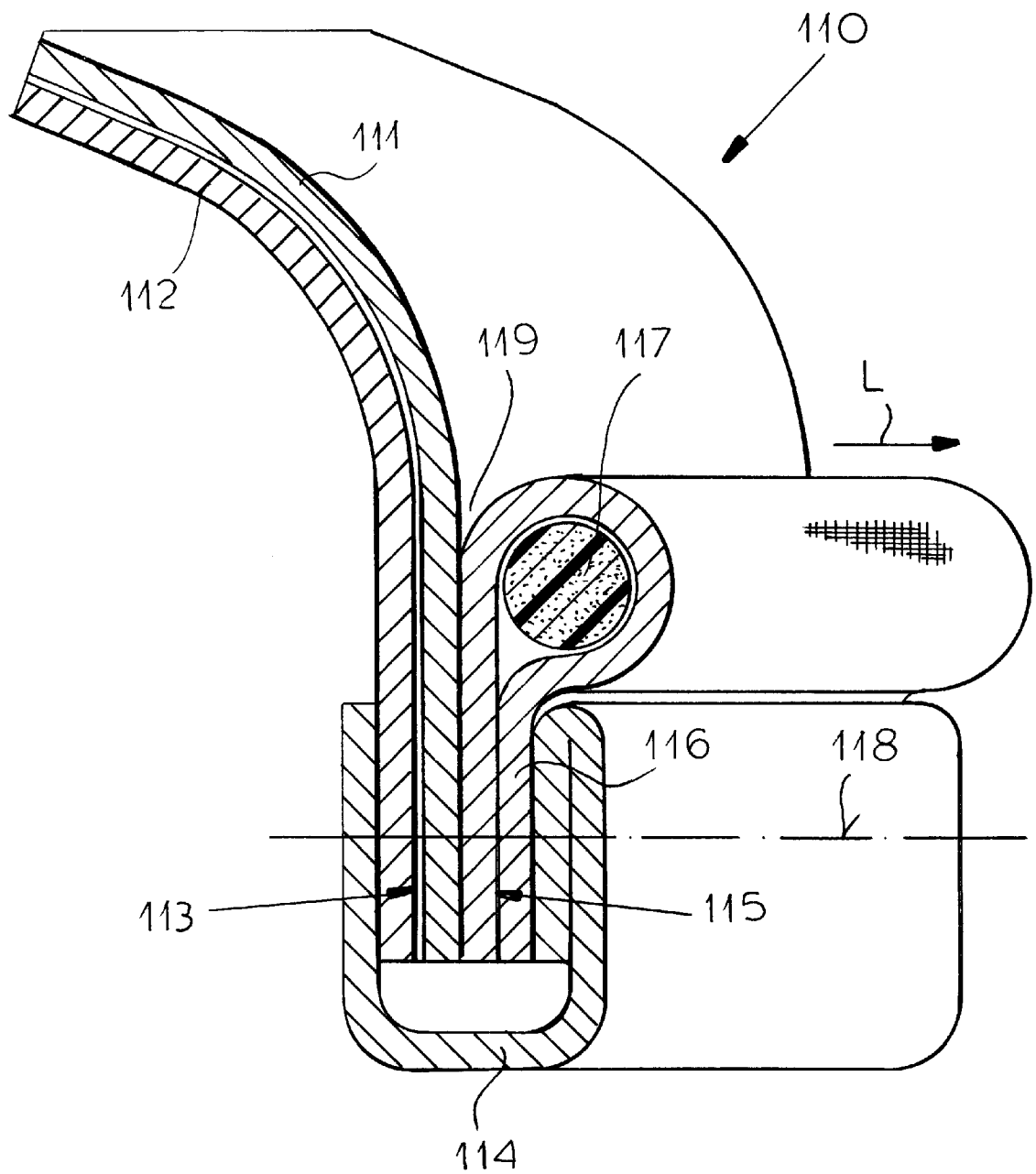
FIG. 4 is a view similar to FIG. 2, illustrating the prior art construction.

Referring first to FIG. 4 which shows the prior art system described above, it will be apparent that the roof covering 110 of the convertible roof has an outer layer 111 laminated to an inner layer 112 and a downwardly-extending lateral edge portion 113 which extends along a longitudinal edge of the roof and, is received in a U-shaped binding strip 114 which may be composed of a rubberized fabric or the like. This binding strip 114 which has an inwardly-turned portion 114a, also includes the downwardly-extending edge portion 115 of a fabric strip 116 extending over a bead 117 composed of foam rubber. The bead 117 and its cover strip 116 can collectively be consisted of the bead-forming strip of this roof. The binding strip 114 is stitched through the edge portion described along the line 118.

The bead 117 and its cover strip 116 of fabric forms, in the longitudinal direction L of the vehicle, a bead which defines a channel 119 with roof covering 111, 112, which is wedge shaped and collects rain water from the roof and carries it off in the longitudinal direction of the vehicle. Obviously the rainwater channel 119 is of limited capacity.

Figure 1:
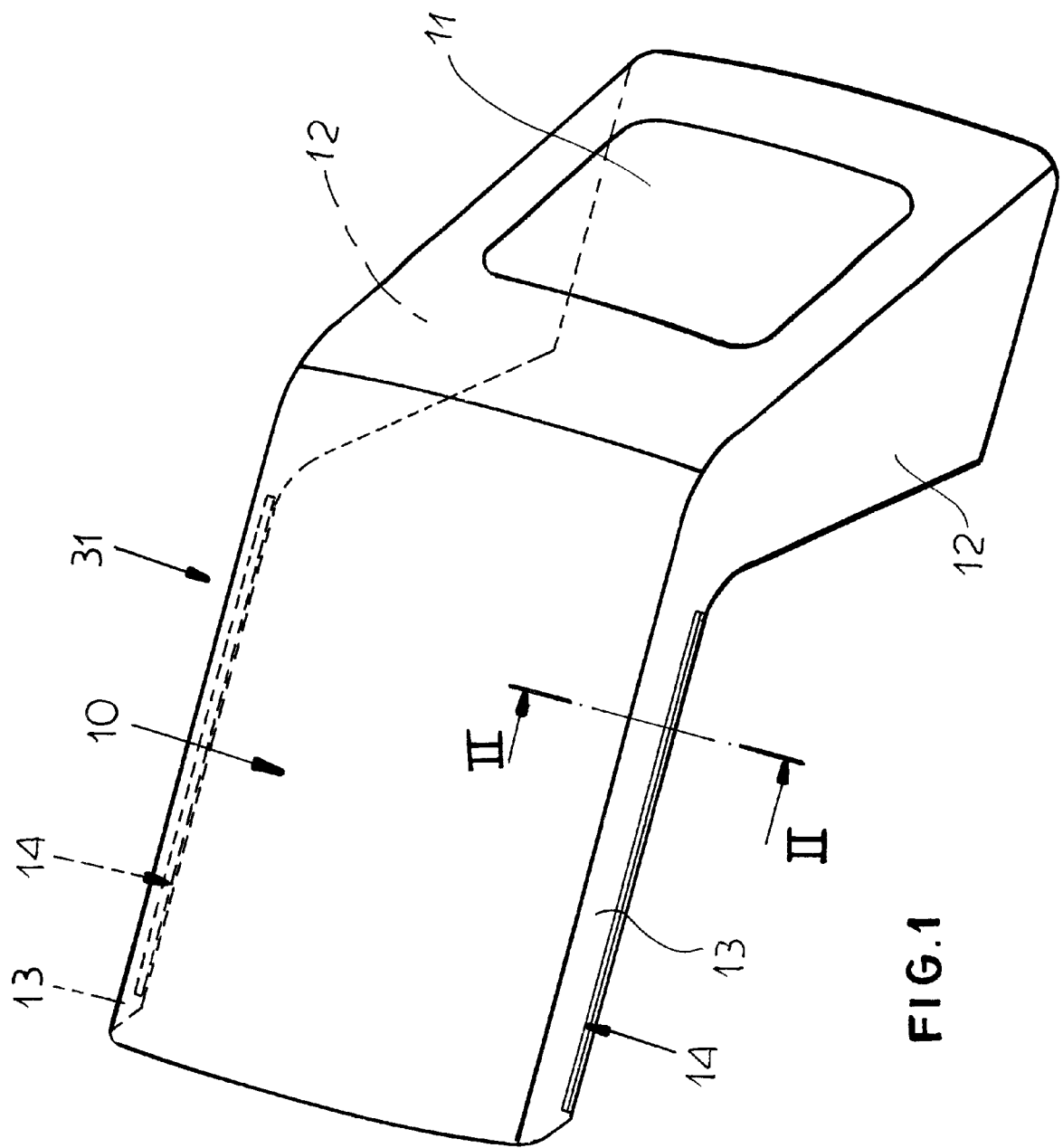
FIG. 1 is a diagrammatic perspective view of a convertible top according to the invention.

By contrast, the convertible roof 10 shown in FIGS. 1 and 2, according to the invention, may also have outer and inner layers 15 and 16 laminated together and formed with, for example, a rear window 11 in a rear portion of this roof. The lateral sides of the roof are represented at 12 and along the longitudinal edges downwardly-extending portions 13 can be provided between which the windshield can be received. These downwardly-extending portions 16 can extend to the so-called A column in the case of a roadster or to the C column in a four-seater automobile. The roof can be provided with stiffeners or the like extending transversely of the vehicle and covered by the side portions 12.

Along opposite sides of the vehicle, downwardly-extending portions 13 are provided with respective rain channels 14 which have the construction shown in FIG. 2.

In FIG. 2 the laminated members 15 and 16 of the roof covering 10 have been shown on these layers which are coextensive with one another and extend into a downwardly-extending longitudinal edge region 17.

The channel is constituted by a flexible bead-forming strip 18 which extends along the edge 17 in the longitudinal direction L of the vehicle and is constituted by a foam-rubber bead 19 which has been previously described received in a cover strip 20 of fabric. The cover strip 20 has two flaps which are brought together at 21 in an edge region. The flaps 21 extend the full length of the edge region 17 and are coextensive therewith. Between the edge region 17 of the roof cover in 10 and the edge region 21 of the bead-forming strip 18, a channel profile or spacing 22 is provided according to the invention. This spacing is composed of rubber or plastic.

As can be seen from FIG. 2, the height of the spacing is substantially equal to the body-forming strip 18 or, preferably, slightly less. In cross section the spacer 22 is seen to comprise a rib 23 and a pair of shanks 24 and 25. Between the shanks there is an upwardly-open but downwardly-tapering wedge-shaped channel 26. This channel is delimited by the upwardly-narrowing shank 24 which rests against the roof covering 10 and diverges away from the somewhat thicker shank 25. The inner surfaces of the channel 26 and thus of the upper portion of the spacer 22 are smooth.

The shank 24 extends at an acute angle of about 27° to the vertical to lie more or less flush against an upper portion of the covering 10. At the transition between the upper portion of the covering 10 and the inner side of the shank 22 there is, therefore, no significant discontinuity.

The parts of the structure described, namely, edge regions 17 of the roof covering 10, the edge region 21 of the roof-forming strip 18 and the rib 23 of the spacer 22 are held together by means of a U-shaped binding strip 27 of synthetic resin or textile material stitched through these edge regions and the spaced by a sewing seam 28.

From FIGS. 2 and 3 it will also be apparent that the spacer 22 in its configuration before it is mounted in place to form the channel, has an angle 29 between the rib 23 and the shank 24 at which the shank 24 diverges from the rib 23.

In FIG. 3 the spacer 22 is shown to an enlarged scale of 10 to 1 with respect to its actual dimensions. The angle 29, in the built-in state, is eliminated by compression of the shanks 24 and 25 toward one another, and the angle 30 of the channel 26 is substantially reduced. As a result of this configuration, the spacer 22 is compressed when stitched in place and thus elastically presses against the roof covering 10 to firmly seal thereagainst and to lie both flush and smoothly in contact with the roof covering. Nevertheless the channel 26 remains open also by virtue of that intrinsic tendency to expand. The spacer 22 is composed of EPDM with a Shore hardness of 65 Shore A.

We claim:

1. A top for a convertible vehicle, comprising:
   a flexible roof covering having a longitudinal edge;
   a flexible bead-forming strip attached to but spaced from said roof covering along a margin of an outer side of said roof covering along said longitudinal edge, said flexible bead-forming strip comprising a bead located above said edge and a bead cover extending around said bead and having respective margins extending downwardly therefrom to a level of said edge and spaced from said margin of said roof covering;
   a flexible channel-forming spacer between said bead-forming strip and said roof covering, said channel-forming spacer being wedge-shaped and having downwardly converging flanks respectively in contact with said margin of said roof covering and one of said margins of said bead-forming strip, said spacer having a height at most equal to a height of said strip and having at an upper portion of said spacer a downwardly tapering wedge-shaped channel delimited by an upwardly narrowing shank lying against said roof covering and another shank lying against said strip; and
   a U-shaped binding strip attached to an inner surface of said roof covering along said margin of said roof covering and to an outer margin of said bead-forming strip and extending around said edge to hold said bead-forming strip and said spacer on said roof covering.

2. The top defined in claim 1 wherein said channel-forming spacer is an injected or extruded molding of an elastic synthetic resin.

3. The top defined in claim 2 wherein said elastic synthetic resin is a ethylene-propylene-diene monomer synthetic resin.

4. The top defined in claim 3 wherein said spacer has a Shore-A hardness of 60 to 70.

5. The top defined in claim 4 wherein said flanks include a wedge angle of 25 to 30° between them.

6. The top defined in claim 5 wherein one of said flanks lies flat against said roof covering along said edge and is inclined at an angle of 10 to 15° to a vertical.

7. The top defined in claim 6 wherein said upper portion of said spacer has a smooth surface.

8. The top defined in claim 7 wherein said flank of said spacer lying against said roof covering has angularly adjoining segments prior to incorporation of said spacer in said top but coplanar and lying flat against said roof covering when said spacer is affixed between said bead-forming strip and said roof covering along said edge.

* * * * *

UNITED STATES PATENT AND TRADEMARK OFFICE
CERTIFICATE OF CORRECTION

PATENT NO.   : 6,382,702 B1                                                         Page 1 of 1
DATED        : May 7, 2002
INVENTOR(S)  : Manfred Kasparak et al.

It is certified that error appears in the above-identified patent and that said Letters Patent is hereby corrected as shown below:

<u>Title page,</u>
Item [73], Assignees should read:

-- [73] Assignees: PARAT Automotive Schonenbach GmbH & O Co. KG, Remscheid
Bayerische Motoren Werke AG,
Edscha Cabrio-Verdecksysteme GmbH, Hengersburg, all of (DE) --

Signed and Sealed this

Thirteenth Day of May, 2003

JAMES E. ROGAN
*Director of the United States Patent and Trademark Office*